US012752815B2

(12) United States Patent
Dallas et al.

(10) Patent No.: US 12,752,815 B2
(45) Date of Patent: Oct. 6, 2026

(54) ITERATIVE TRAJECTORY REPLANNING FOR EMERGENCY OBSTACLE AVOIDANCE

(71) Applicant: TOYOTA RESEARCH INSTITUTE, INC., Los Altos, CA (US)

(72) Inventors: James A. Dallas, San Jose, CA (US); Michael Thompson, San Juan Capistrano, CA (US); Yan Ming Goh, Palo Alto, CA (US); Avinash Balachandran, Sunnyvale, CA (US)

(73) Assignees: TOYOTA RESEARCH INSTITUTE, INC., Los Altos, CA (US); TOYOTA JIDOSHA KABUSHIKI KAISHA, Toyota (JP)

(*) Notice: Subject to any disclaimer, the term of this patent is extended or adjusted under 35 U.S.C. 154(b) by 454 days.

(21) Appl. No.: 18/176,781

(22) Filed: Mar. 1, 2023

(65) Prior Publication Data

US 2024/0083457 A1 Mar. 14, 2024

Related U.S. Application Data

(60) Provisional application No. 63/406,537, filed on Sep. 14, 2022.

(51) Int. Cl.
*B60W 60/00* (2020.01)
*B60W 30/09* (2012.01)
*B60W 30/095* (2012.01)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............ B60W 60/0011; B60W 30/09; B60W 30/0956; B60W 60/0015; B60W 2520/00;
(Continued)

(56) References Cited

U.S. PATENT DOCUMENTS

| | | | |
|---|---|---|---|
| 8,437,890 | B2 | 5/2013 | Anderson |
| 2016/0147203 | A1 | 5/2016 | Di Cairano |

(Continued)

OTHER PUBLICATIONS

Köhler et al., "A Nonlinear Model Predictive Control Framework Using Reference Generic Terminal Ingredients—Extended Version," 2020 IEEE Transactions on Automatic Control 65(8):3576-3583, arXiv:1909.12765v2, Mar. 11, 2020 (https://doi.org/10.1109/TAC.2019.2949350).

(Continued)

*Primary Examiner* — Shardul D Patel
(74) *Attorney, Agent, or Firm* — SHEPPARD, MULLIN, RICHTER & HAMPTON LLP; Daniel N. Yannuzzi

(57) ABSTRACT

Systems and methods of trajectory planning for an autonomous vehicle are disclosed. Exemplary implementations may: determine a first trajectory plan for the vehicle traveling along a first spatial location at a first point in time, the first trajectory plan being a reference trajectory plan; compute an optimal sequence for the vehicle traveling along a second spatial location at a second point in time subsequent the first point in time; and calculate a second trajectory plan for the vehicle by updating the first trajectory plan with information from the computed optimal sequence.

21 Claims, 9 Drawing Sheets

(52) U.S. Cl.
CPC ..... *B60W 60/0015* (2020.02); *B60W 2520/00* (2013.01); *B60W 2530/20* (2013.01)

(58) Field of Classification Search
CPC ......... B60W 2530/20; B60W 2520/14; B60W 30/095; B60W 40/02; B60W 40/10; B60W 50/00; B60W 60/001; B60W 2050/0005; B60W 60/00; G01C 21/3446; G01C 21/3492
USPC .......................................................... 701/301
See application file for complete search history.

(56) References Cited

U.S. PATENT DOCUMENTS

| | | | | |
|---|---|---|---|---|
| 2016/0357169 | A1 | 12/2016 | Di Cairano | |
| 2020/0278686 | A1* | 9/2020 | Liu | G05B 17/02 |
| 2021/0271245 | A1* | 9/2021 | Bradley | G05D 1/227 |
| 2022/0017118 | A1* | 1/2022 | Shinomoto | B60W 30/0953 |
| 2022/0234570 | A1 | 7/2022 | Berntorp | |
| 2022/0242401 | A1 | 8/2022 | Thompson | |

OTHER PUBLICATIONS

Feng et al., "Robust Platoon Control in Mixed Traffic Flow Based on Tube Model Predictive Control," 2021 IEEE Transactions on Intelligent Vehicles 6(4)711-722, arXiv:1910.07477v3, Jul. 20, 2020, 13 pages (https://doi.org/10.1109/TIV.2021.3060626).

Jain et al., "Optimal Cost Design for Model Predictive Control," 2021 3rd Conference on Learning for Dynamics and Control, Proceedings of Machine Learning Research 144:1-13, 2021, arXiv:2104.11353v2, Jun. 9, 2021 (https://doi.org/10.48550/arXiv.2104.11353).

Dallas et al., "A Real-Time Iterative Trajectory Replanning and Control Approach for Emergency Obstacle Avoidance," 7 pages.

Norby et al., "Adaptive Complexity Model Predictive Control," Submitted to Transactions on Robotics, arXiv:2209.02849v1, Sep. 6, 2022, 16 pages (https://doi.org/10.48550/arXiv.2209.02849).

Hatch et al., "The Value of Planning for Infinite-Horizon Model Predictive Control," 2021 International Conference on Robotics and Automation (ICRA), arXiv:2104.02863v1, Apr. 7, 2021.

Shen et al., "Incremental Proximal Multi-Forecast Model Predictive Control," arXiv:2111.14728v1, Nov. 29, 2021, 18 pages (https://doi.org/10.48550/arXiv.2111.14728).

Frasch et al., "An Auto-Generated Nonlinear MPC Algorithm for Real-Time Obstacle Avoidance of Ground Vehicles," 2013 European Control Conference (ECC), Jul. 2013, 6 pages (https://doi.org/10.23919/ECC.2013.6669836).

Köhler et al., "ARobust Adaptive Model Predictive Control Framework for Nonlinear Uncertain Systems," 2020 International Journal of Robust and Nonlinear Control, arXiv:1911.02899v2, 19 pages (https://doi.org/10.48550/arXiv.1911.02899).

* cited by examiner

500

600

700

ITERATIVE TRAJECTORY REPLANNING FOR EMERGENCY OBSTACLE AVOIDANCE

CROSS-REFERENCE TO RELATED APPLICATIONS

This application claims the benefit of U.S. Provisional Application No. 63/406,537, filed on Sep. 14, 2022, which is hereby incorporated herein by reference in its entirety.

TECHNICAL FIELD

The present disclosure relates generally to controlling operation of an autonomous vehicle, and in particular, some implementations may relate to iterative trajectory replanning for emergency obstacle avoidance.

DESCRIPTION OF RELATED ART

Autonomous vehicles have the potential to improve safety in emergency scenarios in terms of trajectory replanning, even at the vehicle's limits. However, in emergency obstacle avoidance, reference trajectories used in trajectory replanning may no longer be optimal or even applicable, and in extreme scenarios, also create conflicting information when searching for the optimal control inputs. This complexity leads to a challenging trajectory control problem that is burdened by the balance of maintaining trajectory model fidelity through the trajectory replanning (allowing the vehicle to maintain stability throughout challenging emergency scenarios) and computational efficiency (e.g., the cost of finding a completely new trajectory or being influenced by signals that are invalid due to conflicts with changing environments). Better methods are needed to improve automated vehicle operation and obstacle avoidance strategies overall.

BRIEF SUMMARY OF THE DISCLOSURE

According to various embodiments of the disclosed technology, a method of trajectory planning for an autonomous vehicle, comprises: determining a first trajectory plan for the vehicle traveling along a first spatial location at a first point in time, wherein the first trajectory plan is a reference trajectory plan; computing an optimal sequence for the vehicle traveling along a second spatial location at a second point in time subsequent the first point in time; and calculating a second trajectory plan for the vehicle by updating the first trajectory plan with information from the computed optimal sequence.

In some embodiments, nonlinear dynamics of the vehicle are used in the determining of the first trajectory plan and the computing of the optimal sequence. The nonlinear dynamics of the vehicle may correspond to at least one of yaw rate, velocity, sideslip, roadwheel angle, rear wheel speed, lateral error, course error, engine torque, front brake torque, rear brake torque, and longitudinal weight transfer state. In one embodiment, the nonlinear dynamics of the vehicle comprise tire dynamics.

In some embodiments, the first trajectory plan comprises a trajectory that does not include an obstacle or environmental change, and the second trajectory plan comprises a trajectory that includes an obstacle or environmental change.

In some embodiments, the first trajectory plan is determined offline, and the computing of the optimal sequence is performed in real-time whereby the optimal sequence is a current optimal sequence.

In some embodiments, the first trajectory plan is attributed less weight relative to the calculation of the second trajectory plan.

In some embodiments, the method further comprises: computing another optimal sequence for the vehicle traveling along a third spatial location at a third point in time subsequent the second point in time; and calculating a third trajectory plan for the vehicle by updating the second trajectory plan with information from the computed another optimal sequence, wherein the second trajectory plan is another reference trajectory plan in relation to the calculation of the third trajectory plan.

In some embodiments, the second trajectory plan and the third trajectory plan comprise trajectories that include an obstacle or environmental change.

In some embodiments, the second trajectory plan is attributed less weight relative to the calculation of the third trajectory plan.

According to additional embodiments of the disclosed technology, a vehicle control system for trajectory planning for an autonomous vehicle comprises: a processor; and a memory coupled to the processor to store instructions. When the instructions are executed by the processor, the processor is caused to perform operations. The operations comprise: determining a first trajectory plan for the vehicle traveling along a first spatial location at a first point in time, wherein the first trajectory plan is a reference trajectory plan; computing an optimal sequence for the vehicle traveling along a second spatial location at a second point in time subsequent the first point in time; and calculating a second trajectory plan for the vehicle by updating the first trajectory plan with information from the computed optimal sequence.

In some embodiments, nonlinear dynamics of the vehicle are used in the determining of the first trajectory plan and the computing of the optimal sequence. The nonlinear dynamics of the vehicle may correspond to at least one of yaw rate, velocity, sideslip, roadwheel angle, rear wheel speed, lateral error, course error, engine torque, front brake torque, rear brake torque, and longitudinal weight transfer state. In one embodiment, the nonlinear dynamics of the vehicle comprise tire dynamics.

In some embodiments, the first trajectory plan comprises a trajectory that does not include an obstacle or environmental change, and the second trajectory plan comprises a trajectory that includes an obstacle or environmental change.

In some embodiments, the first trajectory plan is determined offline, and the computing of the optimal sequence is performed in real-time whereby the optimal sequence is a current optimal sequence.

In some embodiments, the first trajectory plan is attributed less weight relative to the calculation of the second trajectory plan.

In some embodiments, the operations further comprise: computing another optimal sequence for the vehicle traveling along a third spatial location at a third point in time subsequent the second point in time; and calculating a third trajectory plan for the vehicle by updating the second trajectory plan with information from the computed another optimal sequence, wherein the second trajectory plan is another reference trajectory plan in relation to the calculation of the third trajectory plan.

In some embodiments, the second trajectory plan and the third trajectory plan comprise trajectories that include an obstacle or environmental change.

In some embodiments, the second trajectory plan is attributed less weight relative to the calculation of the third trajectory plan.

According to further embodiments of the disclosed technology, a non-transitory machine-readable medium comprises instructions stored therein. When the instructions are executed by a processor, the processor is caused to perform operations. The operations comprise: determining a first trajectory plan for the vehicle traveling along a first spatial location at a first point in time, wherein the first trajectory plan is a reference trajectory plan; computing an optimal sequence for the vehicle traveling along a second spatial location at a second point in time subsequent the first point in time; and calculating a second trajectory plan for the vehicle by updating the first trajectory plan with information from the computed optimal sequence.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
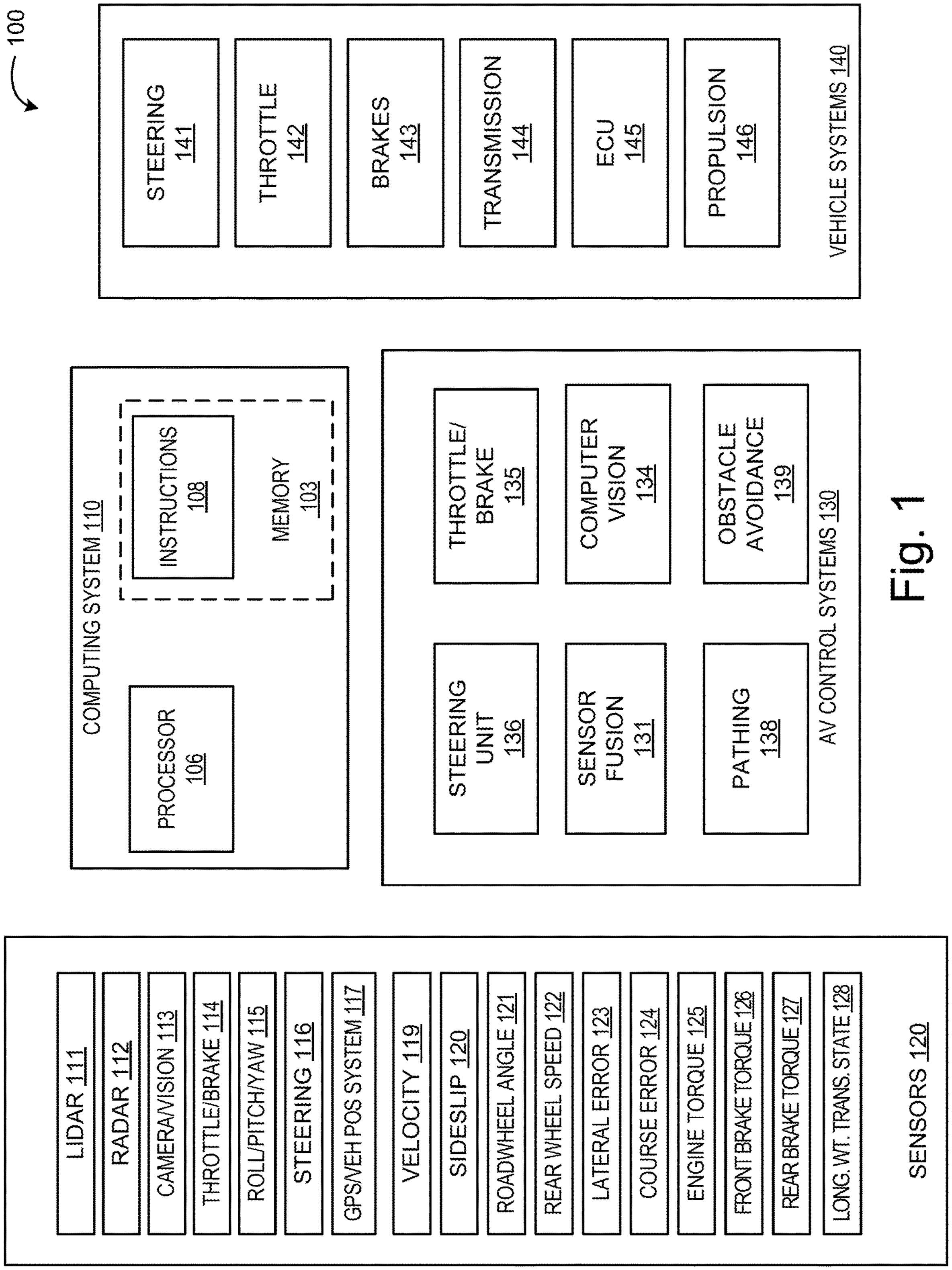
FIG. 1 illustrates another example architecture for a vehicle control system for trajectory planning for an autonomous vehicle with which embodiments of the disclosed technology may be implemented.

The figures are not exhaustive and do not limit the present disclosure to the precise form disclosed.

DETAILED DESCRIPTION

Embodiments of the systems and methods disclosed herein can provide trajectory planning for an autonomous vehicle. In some examples, the systems and methods described in this disclosure can even provide online trajectory planning (or replanning) for controller reference trajectories that may become infeasible due to changing environmental conditions or when a blocking obstacle suddenly appears in the vehicle path.

Current technologies rely on offline reference trajectory plans that do not update with changing environments or when an obstacle suddenly appears. The offline reference trajectory plan (or information used to derive or calculate the plan) can be stored, for example, offline in a memory of a server (e.g., a cloud server) that is stored locally (within the vehicle) or stored remotely (accessible via the internet). Instead of being stored in memory, the plan or information used to derive the plan may be in the form of a look-up table or other hierarchal form of data that is able to be looked-up, accessed, and downloaded. In any of these scenarios, the reference trajectory plan is based on information derived at a prior point in time, i.e., it is not real-time data. Thus, if an obstacle (or environmental change) suddenly pops up while driving a vehicle then the offline reference trajectory may intersect the obstacle, which could result in a crash of the vehicle into the suddenly-appearing obstacle or, at the least, could result in a sudden swerve of the vehicle to avoid the obstacle which itself could resulting in an oversteering of the vehicle, leading to another type of crash or happenstance (e.g., with another vehicle or other road or environmental object such as a tree, building, etc.). This problem occurs because the offline reference trajectory is calculated or otherwise obtained from information corresponding to the past, i.e., prior to the obstacle making its appearance within the trajectory. Hence, in most scenarios, the reference trajectory neglects to account for the suddenly appearing obstacle.

Alternatively, online trajectory replanning algorithms (i.e., those that utilize real-time information) rely on simplifications such as used in point mass trajectory models. Example uses of these point mass trajectory models are rapidly exploring random tree (RRT) and A*. Because these online trajectory replanning models are simplifications, they and do not consider the complex and nonlinear dynamics of the vehicle that can occur, especially in emergency obstacle avoidance situations.

Embodiments of the present disclosure improve upon conventional offline reference trajectory and online trajectory replanning algorithms with a novel trajectory replanning technique that rapidly iterates to improve reference trajectories, for example, when the reference trajectory becomes infeasible. This novel trajectory replanning technique also provides a trajectory control solution that maintains trajectory model fidelity through the trajectory replanning (allowing the vehicle to maintain stability throughout challenging emergency scenarios) and maintains computational efficiency (e.g., by removing the cost associated with finding a completely new trajectory and removing the influence by signals that are invalid due to conflicts with changing environments).

As an optional technique, model predictive control (MPC) may be combined with the rapid iterative reference trajectory replanning scheme. In doing so, the further benefits of dynamic performance associated with nonlinear MPC (NMPC) can be achieved along with the above-mentioned advantages associated with rapid iterative reference trajectory replanning. A feature of this optional implementation can incrementally replan reference trajectories online and diminish the impact of conflicting reference trajectory signals, while considering the vehicle's nonlinear dynamics (including tire dynamics such as, for example, tire saturation, tire friction, etc.) in real-time. Combined with NMPC, this optional scenario can perform better than existing NMPC technologies, especially in emergency scenarios, such as emergency obstacle avoidance.

The systems and methods disclosed herein may be implemented with any of a number of different autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example autonomous vehicle with which embodiments of the disclosed technology may be implemented. In this example, vehicle 100 includes a computing system 110, sensors 120, AV control systems 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include LIDAR 111, radar 112, or other distance measurement sensors, image (camera/vision) sensors 113, throttle and brake sensors 114, 3D accelerometers 115 (e.g., to detect roll/pitch/yaw or, alternatively, to detect just one vehicle orientation such as yaw), steering sensors 116, and a GPS or other vehicle positioning system 117. This example also includes additional sensors 120 such as vehicle velocity sensor 119, sideslip sensors 120 (i.e., left-right slip ratio sensors), roadwheel angle sensor(s) 121 (e.g., one for each wheel), rear wheel speed sensors 122 (e.g., one for each wheel), lateral error sensor(s) 123, course error sensor(s) 124, engine torque sensor(s) 125, front brake torque sensors 126 (e.g., one for each front brake), rear brake torque sensors 127 (e.g., one for each rear brake), and/or longitudinal weight transfer state sensor(s) 128. Additional sensors can also be included as may be appropriate for a given implementation of AV control systems 130. For example, sensors 120 can include environmental sensors (e.g., to detect road/ground conditions such as ground wetness, ice, or other environmental conditions including, for example, atmospheric conditions such as weather). One or more of the sensors 120 may gather data and send that data to the vehicle electronic control unit (ECU) 145 or other processing unit. Sensors 120 (and other vehicle components) may be duplicated for redundancy.

Distance measuring sensors such as LIDAR 111, radar 112, IR sensors and other like sensors can be used to gather data to measure distances and closing rates to various external environmental conditions (such as ice patches) or objects such as other vehicles, obstacles (such as obstacle 244 shown in FIGS. 2A-2C), traffic signs, pedestrians, animals, light poles and other objects. Image sensors 113 can include one or more cameras or other image/vision sensors to capture images of the environment around the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects/obstacles/environmental changes to be avoided (e.g., other vehicles, pedestrians, bicyclists, etc.) and other landmarks or features. Information from image sensors 113 can be used in conjunction with other information such as map data or information from positioning system 117 to determine, refine or verify vehicle location. Moreover, information from image sensors 113 can alternatively or additionally be used in conjunction with other information such as from the LIDAR 111 or radar sensors 112 to determine, refine or verify distances of any of the above items (e.g., obstacles/environmental changes) relative to the vehicle.

Throttle and brake sensors 114 can be used to gather data regarding throttle and brake application generated autonomously. Accelerometers 115 may include a 3D accelerometer to measure roll, pitch and yaw of the vehicle (or to measure just one vehicle orientation such as yaw, if desired). Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle generated autonomously. A steering sensor may include a position encoder to monitor the angle of the steering input in degrees. Analog sensors may be used to collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation, but is generally unusual at highway or other high speeds. Excessive steering input (e.g., turning a steering wheel quickly while the vehicle is traveling at such high speeds) can lead to vehicle control issues due to, for example, tire slippage from insufficiently low tire friction between the tire and road, in relation to the vehicle speed. In other words, if the driver is turning the steering wheel at a fast rate while driving at highway or other high speeds, the vehicle computing system 110 may interpret that as an indication that the vehicle is out-of-control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

vehicle velocity sensor 119 can be used to gather velocity information about a current speed of the vehicle. The vehicle velocity sensor 119 may also, for example, be embodied in GPS (or other positioning system) which can be used in calculating vehicle velocity by using multiple vehicle position information and timing information (i.e., the amount of time the vehicle takes to travel between vehicle positions). Alternatively, the vehicle velocity sensor 119 may be in the form of other non-wheel speed sensing techniques such as a transmission speed sensor which is a component mounted on a vehicle's transmission that lets the ECU 145 and/or computing system 110 know the current speed of the vehicle.

Sideslip sensors 120 (i.e., left-right slip ratio sensors or vehicle side-slip angle sensors) measures the angle between the vehicle longitudinal direction and the traveling direction of the vehicle center of gravity, i.e., the tangent line of the circular path. It shows the attitude of the vehicle in relation to the circular path during a steady-state cornering. Sideslip angle can be estimated by, for example, combining measurements from GPS, Inertial Measurement Unit (IMU), and a magnetometer in the Kalman filter framework. Kalman filtering, also known as linear quadratic estimation (LQE), is an algorithm that uses a series of measurements observed over time, including statistical noise and other inaccuracies, and produces estimates of unknown variables that tend to be more accurate than those based on a single measurement alone.

Roadwheel angle sensor(s) 121 (e.g., one for each wheel) are used to measure the steering angle at the wheels. Without a wheel angle sensor, the system has to guess which angle/direction the wheels are pointed based off of changes in the vehicle heading while moving.

Rear wheel speed sensors 122 (e.g., one for each wheel) are also known as ABS sensors. Wheel speed sensors allow the ECU 145 to monitor each wheel on the car separately. This allows the ECU 145 to use the individual wheel speed data in safety systems such as vehicle stability control (VSC) and anti-lock braking (ABS). Wheel speed sensors are not located in the wheels themselves. They're usually mounted in the hubs of the vehicle. A wheel speed sensor is a simple toothed ring and pickup module that sends current to the ABS or ECU 145 for analysis. In the ABS, wheel speed sensors tell the AV control systems 130 which wheels are moving faster or slower than the others. They also tell the AV control systems 130 if one or more wheels are locking up during braking. In the VSC, the wheel speed sensors inform the AV control systems 130 when one or more wheels are slowing or speeding up due to traction issues, allowing the AV control systems 130 to compensate and keep the vehicle stable and in control. Finally, in some vehicles, wheel speed sensors provide information to the ECU 145 which may become the speed readout shown by the speedometer. A comparison of the information from the rear wheel speed sensors 122 and the vehicle velocity sensor 119 can also be used to determine whether slippage of the rear wheels has occurred, and to inform the ECU 145 and/or computing system 110 when the slippage has occurred.

Lateral error sensor(s) 123 can be used to measure the lateral error of the vehicle. The lateral error of the vehicle is the distance between the center of the vehicle's front axle to the closest path point in the trajectory path. This relative distance is measured by, for example, a GPS sensor.

Course error sensor(s) 124 (e.g., GPS or other positioning system) refers to a deviation in the vehicle heading angle. This vehicle heading angle information can be input to the computing system 110 and/or other systems of the vehicle 100 which can cross-reference the vehicle heading angle information with information regarding the reference heading angle, to determine whether a deviation of the vehicle's heading from the reference trajectory path has occurred. If a determination is made that a deviation has occurred, an amount of such deviation may be measured and provided.

Engine torque sensor(s) 125 Torque is an effective measurement when seeking to quantify the true mechanical torque on the driveline component, such as a driveshaft or a coupling. The most common method for measuring torque and power of an engine is through a dynamometer which measures both the torque and the speed applied by the engine. The end result is an engine performance curve, which graphs torque, speed, and power. This method is what is used by engine manufacturers to develop the specifications for a particular engine. It is also a common method for quantifying the true power output for cars. Other ways to measure the true torque (and power output) of a vehicle's engine are to use a surface-mount torque telemetry system that relies on a strain gauge sensor. This method tends to be the most accurate option as it provides horsepower data quickly and accurately.

Front brake torque sensors 126 (e.g., a disc brake mounting bracket torque sensor, one for each front brake) can be used to measure the braking force acting on the rotor of a vehicle's front wheel. The sensor can be, for example, a piezoelectric sensor located in the brake caliper of a front wheel's disc brake.

Rear brake torque sensors 127 (e.g., a disc brake mounting bracket torque sensor, one for each rear brake) can be used to measure the braking force acting on the rotor of a vehicle's rear wheel. The sensor can be, for example, a piezoelectric sensor located in the brake caliper of a rear wheel's disc brake.

Longitudinal weight transfer state sensor(s) 128 detects an inertial force (or variance in load force at the wheels) due to the longitudinal acceleration at the vehicle center of gravity (CG) which causes a weight shift to the rear axle, producing improved grip (i.e., an increased load) by the rear wheels and reduced grip (i.e., a decreased load) by the front wheels. Conversely, longitudinal deceleration of the vehicle produces reduced grip by the rear wheels and improved grip by the front wheels.

Although not illustrated, other sensors 120 may be provided as well. Various sensors 120 may be used to provide input to computing system 110 and other systems of vehicle 100 so that the systems have information useful to operate in an autonomous mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139.

Sensor fusion module 131 can be included to evaluate data from a plurality of sensors, including sensors 120. Sensor fusion module 131 may use computing system 110 or its own computing system to execute algorithms to assess or otherwise use inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front and/or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment surrounding the vehicle. For example, algorithms operating as part of computer vision module 134 can evaluate still or moving images to determine features and landmarks (e.g., road signs, traffic lights, lane markings and other road boundaries, etc.), obstacles (e.g., animals, pedestrians, bicyclists, other vehicles, other obstructions in the path of the subject vehicle) and other objects. The system can include video tracking and other algorithms to recognize objects such as the foregoing, estimate their speed and/or direction, map the surroundings, and so on.

Pathing module 138 may be included to compute a desired path for vehicle 100 based on input from various sensors 120 and AV control systems 130. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other AV control systems 130. This real-time information may be used as input for a computation of an optimal sequence/solution for the vehicle. As described below, a calculation of a current trajectory plan for the vehicle can then be performed by updating a reference trajectory plan (or previous optimized trajectory plan) with information from the computed optimal sequence.

Obstacle avoidance module 139 can be included to determine control inputs necessary (i.e., input to vehicle systems 140) for controlling the vehicle's movement in order to avoid obstacles detected by sensors 120 or AV control systems 130, whilst in accordance with any of the iterative trajectory replanning algorithms described below. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, vehicle systems 140 include steering system 141, throttle system 142, brakes 143, transmission 144, ECU 145 and propulsion system 146. These vehicle systems 140 may be controlled by AV control systems 130 in autonomous mode. For example, in autonomous mode, AV control systems 130, alone or in conjunction with other systems, can control vehicle systems 140 to operate the vehicle in a fully autonomous fashion.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data (such as, for example, data relating to reference trajectory plans) and other information used by the vehicle and its systems and subsystems for operation, including operation of vehicle 100 in autonomous mode, in accordance with any of the iterative trajectory replanning algorithms described below.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components. In some examples, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding obstacles (such as obstacle 244 shown in FIGS. 2A-2C), data regarding infrastructure elements, data regarding operation and intention of surrounding vehicles, and so on.

The example of FIG. 1 is provided for illustration purposes only as one example of a vehicle system with which embodiments of the disclosed technology may be implemented. One of ordinary skill in the art reading this description will understand how the disclosed embodiments can be implemented with this and other vehicle platforms.

An Example Implementation of Trajectory Replanning for Obstacle Avoidance

In this example implementation, spatial incremental replanning is presented as an approach that incrementally updates reference trajectories when needed (or, optionally, on a continuous basis), thereby achieving reliable real-time implementation even when a pre-computed trajectory is not or no longer feasible. Although optional, this approach is implemented in combination with a high-fidelity NMPC formulation. MPC is a technique for emergency obstacle avoidance due its capability to replan rapidly to find collision-free trajectories while considering complex nonlinear vehicle dynamics (via use of NMPC). While previous approaches have considered MPC for obstacle avoidance, such techniques ignore important aspects of the vehicle dynamics by not accounting for a vehicle's nonlinear dynamics (especially tire dynamics such as tire saturation and tire friction). Obstacle avoidance in MPC utilizes tracking of a reference trajectory. However, these reference trajectories can be crude approximations that are not meant to be explicitly followed. In particular, these reference trajectories can in fact intersect the obstacle, providing conflicting information for an MPC optimizer. Other reference trajectory tracking approaches have impacted the behavior of MPC and shaped the solution to avoid obstacles as tightly to the reference trajectory as possible. However, these other approaches often lead to sudden/drastic changes in vehicle direction to avoid the obstacles.

This example implementation employs a novel replanning routine that rapidly iterates to improve reference trajectories when, for example, the reference trajectory becomes infeasible. To demonstrate the effectiveness of the approach, this example implementation considers the integration of NMPC in utilizing a vehicle's nonlinear dynamics (e.g., tire dynamics such as tire saturation and tire friction). This combination approach achieves the dynamic performance of NMPC with rapid iterative reference trajectory replanning. In the reference trajectory replanning phase (or the further iterations, as mentioned below), the previous NMPC solution is used as the reference trajectory for the next optimization and is blended with the offline plan for points beyond the NMPC solution horizon. This allows the NMPC to iteratively find an optimal path around the obstacle without being burdened by the computational cost of finding a completely new trajectory or being influenced by signals that are invalid due to conflicts with changing environments. This also allows the vehicle to maintain stability throughout challenging emergency scenarios.

If the next trajectory plan only considered information from the computed optimal sequence (i.e., without relying on the original/reference trajectory plan in the calculation of the next trajectory plan), an obstacle suddenly appearing in the trajectory would likely cause a trajectory change that would require an immediate/drastic adjustment from the original trajectory, resulting in a jarring shift in vehicle direction (and, hence, for the vehicle's occupants) in order to avoid the obstacle. Whereas, when the reference trajectory is used in the calculation of the next trajectory plan, a more gradual effect in the change in vehicle trajectory direction can be realized. This incremental replanning results in a smoother trajectory change from the reference trajectory plan to the next trajectory plan and a smoother experience from the perspective of the vehicle's occupants.

Spatial Iterative Replanning

Spatial iterative replanning (SplRe) is executed, for example, when a conflict is detected between the offline reference trajectory path and the current environment. While SplRe is envisioned for general reference trajectory infeasibilities, this example implementation demonstrates the approach with emergency obstacle avoidance. For demonstration purposes, this example implementation is applied to autonomous racing. An obstacle is represented by moving the track bounds to exclude the obstacle, hence a conflict occurs when any point in the reference horizon is outside of the collision-free navigatable tube (i.e., within the track bounds). An example general algorithm for executing SplRe (i.e., in terms of accounting for cost function weights) is described in detail in the next paragraph and is summarized as:

```
if No Conflict Detected then
    (A, B, C)←(A, B, C)_nom
    x_ref←x_offline
    u_ref←u_offline
else
    (A, B, C)←(A, B, C)_replan
    x_contingent←[x_prev, x_offline]
    u_contingent←[u_prev, u_offline]
```

-continued

```
    x_ref←x_contingent
    u_ref←u_contingent
end if
```

Here, the matrices (A, B, C, . . . ) represent a generalization of cost function weights for an MPC optimization problem. When a conflict is detected, SplRe updates these matrices to a configuration, replan, that reduces the relative weight of the reference trajectory tracking. A specific example is described in section A of the MPC Formulation section below whereby the reference trajectory tracking weights (in the cost function) are reduced, allowing MPC to be less burdened by following a (previously determined/obtained) reference trajectory. This is particularly advantageous when the reference trajectory becomes infeasible. Next, the reference trajectory states $x_{ref}$ and inputs $u_{ref}$ are switched from the offline plan x, $u_{offline}$ to a contingent plan, x, $u_{contingent}$. This contingent plan consists of the previous optimal solution, $x_{prev}$ and $u_{prev}$, appended with the offline plan, $x_{offline}$ and $u_{offline}$, for points beyond the solution horizon.

Critically, this contingent plan is (preferably continuously) updated with a new solution for the optimization sequence. The iterations continue for as long as a conflict exists between the reference trajectory plan and the detected boundaries of the track. This allows the controller to iteratively update the reference trajectory as it moves along spatially, such that even if the solution at first detection is suboptimal due to a reliance on the reference trajectory, subsequent solutions become increasingly more optimal for the emergent situation.

Figure 2A:
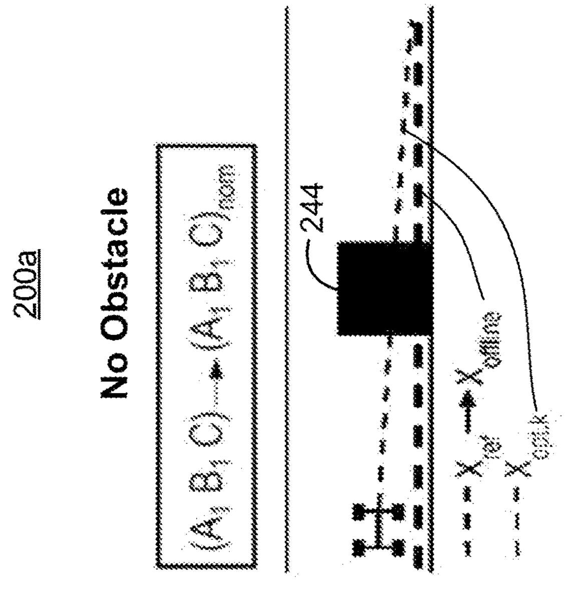
FIG. 2A illustrates an example trajectory where no obstacle is detected.
Figure 2B:
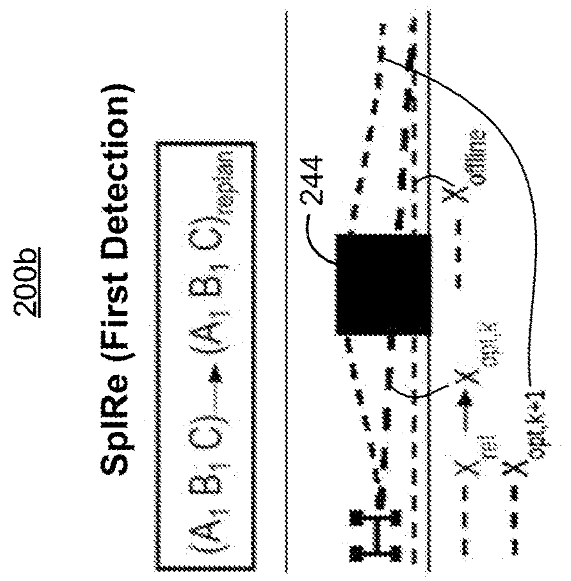
FIG. 2B illustrates an example iterative trajectory for obstacle avoidance, upon first detection of the obstacle, while using a vehicle control system for trajectory planning.
Figure 2C:
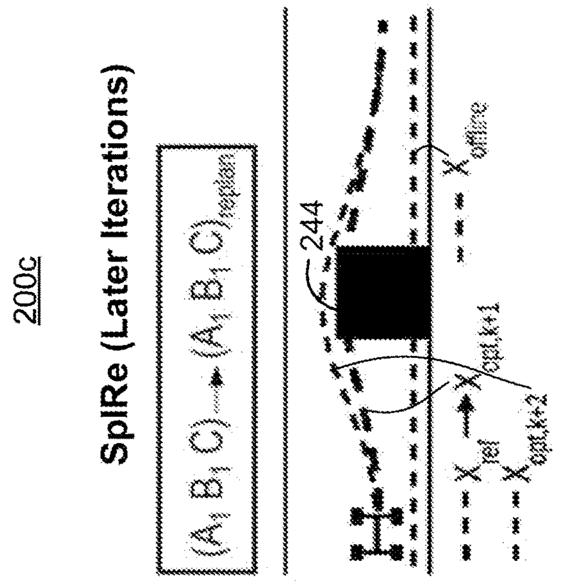
FIG. 2C illustrates an example iterative trajectory for obstacle avoidance, after first detection of the obstacle, in accordance with embodiments disclosed herein.

A pictorial representation of this process is given in FIGS. 2A-2C, where the optimal solution of each time instance is shown as a non-bolded dashed line, and the current reference trajectory is shown as the bold dashed line. Prior to detection of the obstacle 244, the offline plan is treated as the reference trajectory path (see trajectory plans where no obstacle is accounted for, illustrated in scenario 200*a* in FIG. 2A). With reference to FIG. 2B, at first detection of the obstacle 244, the reference trajectory is changed to be the previous optimal solution (see the trajectory plans under SplRe in which a first detection of an obstacle 244 is illustrated in scenario 200*b* in FIG. 2B). Here, the reference trajectory is the same as the previous optimal solution from FIG. 2A, and the new optimal solution is shown as the top dotted line in FIG. 2B. With reference to FIG. 2C, later time instances iteratively improve the reference trajectory to avoid the obstacle while still accounting for the vehicle's nonlinear dynamics and cost (see trajectory plans under SplRe in which later iterations accounting for the obstacle 244 detection are illustrated in scenario 200*c* in FIG. 2C). The newest optimal solution totally avoids the obstacle 244 as shown by the top dotted line in FIG. 2C. This iterative reference trajectory improvement is also demonstrated in the experimental results discussed in the Results section below.

MPC Formulation

In the example implementation which validates the effectiveness of SplRe, the SplRe scheme is used in conjunction with a high-fidelity NMPC formulation for autonomous racing up to the limits of handling of the vehicle. For completeness, and to illustrate the complexity of the dynamics, the controller routine is compactly described here. First, the general form of the optimization problem (i.e., used in calculating an optimized sequence or solution for a trajectory) is:

$$\min J \tag{1}$$

$$\text{s.t.}$$

$$\begin{aligned}
&x_{k+1} = f(x_k, u_k) && \forall\, k \in [1, N]\\
&g(x_k, u_k) = 0 && \forall\, k \in [1, N]\\
&h(x_k, u_k) \le 0 && \forall\, k \in [1, N]\\
&x_{min} \le x_k \le x_{max} && \forall\, k \in [1, N]\\
&u_{min} \le u_k \le u_{max} && \forall\, k \in [1, N]\\
&x_0 = x_{lookahead} && \forall\, k \in [1, N]
\end{aligned}$$

With the states and inputs being x and u, respectively. The state is constrained to be within the bounds $x_{min}$ and $x_{max}$ and the input is constrained to be within $u_{min}$ and $u_{max}$. Lastly, $x_0$, the initial state, is equal to the propagated initial state $x_{lookahead}$. The cost function, J, and state evolution are described in the following subsections.

A. Cost Function

The reference trajectory is attributed less weight (e.g., less than 10% in weight) relative to the calculation of the subsequent trajectory plan. The reduced weighting of the reference trajectory plan allows the calculation of the subsequent trajectory to be less burdened by a previously obtained (out-of-date) and non-optimal reference trajectory plan. The cost function/related to the attribution of weight is given in equation (2) below as:

$$J = J_{s_N} + \sum_{i=0}^{N}\Big(w_t t + (x - x_{ref})^T A(x - x_{ref}) + (u - u_{ref})^T B(u - u_{ref}) + (\dot{u} - \dot{u}_{ref})^T C(\dot{u} - \dot{u}_{ref}) + w_\alpha \alpha_{f_i}^2 + J_{slack} + w_b(\tau \cdot \tau_{brake})^2\Big) \cdot ds_i \tag{2}$$

Where A is a diagonal matrix weighting [e, V, $\tau_{brake,f}$, $\tau_{brake,r}$], B is a diagonal matrix weighting [$\tau_{brake,f}$, $\tau_{brake,r}$], and C is a diagonal matrix weighting [$\ddot{\delta}$, $\ddot{\tau}$]. The lateral error e, vehicle velocity V, front brake torque, and rear brake torque are taken from the vehicle model of Eq. 4 below and are factors in ($x-x_{ref}$); the front brake torque and rear brake torque rates are factors in ($u-u_{ref}$); and the roadwheel angle and engine torque acceleration are also taken from the vehicle model of Eq. 4 below and are factors in (u–u̇ref). This example SplRe application reduces the cost/weighting on the lateral error e state. The cost function variable $J_{slack}$ contains slack costs on violating track, sideslip, and friction circle bounds, and the cost function variable $J_{sN}$ imposes costs on the terminal stability of lateral error and sideslip. The decreased weighting on the lateral error e state produces less weighting which is represented in $J_{slack}$ and $J_{sN}$. The result of the application of this cost function equation/is the attribution of less weight relative to the calculation of the subsequent trajectory plan.

B. Vehicle Model

Figure 3:
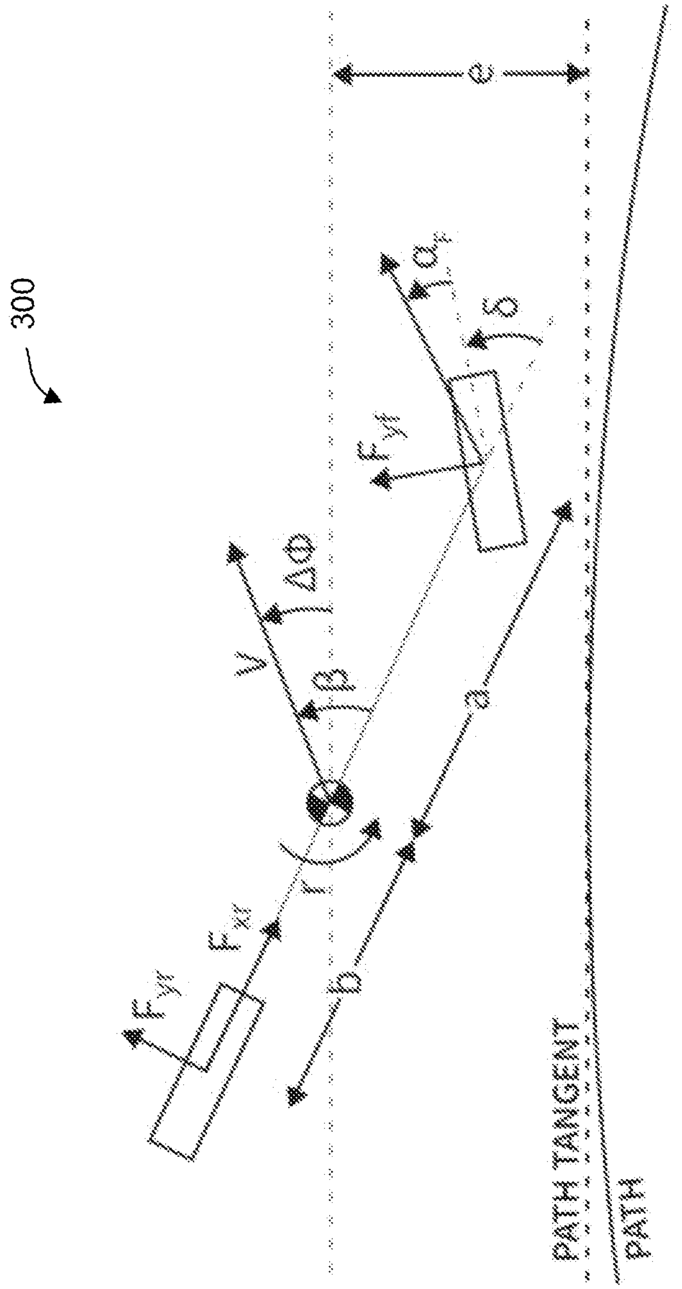
FIG. 3 illustrates an example single-track bicycle model used to describe relationships between states of an example vehicle, in accordance with embodiments disclosed herein.

FIG. 3 illustrates, for ease of understanding, an example single-track bicycle trajectory model 300 used to describe relationships between states of an example vehicle, in accordance with embodiments disclosed herein. In this example, the vehicle model 300 uses a single-track layout in a curvilinear (Frenet) coordinate system. A Frenet coordinate system is commonly used to represent position on a road in a more intuitive way than traditional (x,y) cartesian coordinates. With Frenet coordinates, variables s and d are used to describe a vehicle's position on the road or a reference trajectory path. The example consists of 4 inputs (front and rear brake torque rates, engine torque rate, and road wheel angle rate) and 11 derivative states. The 11 states are given in items (3) below as:

$$x = \begin{bmatrix} r \\ V \\ \beta \\ \delta \\ \omega_r \\ e \\ \Delta\phi \\ \tau \\ \tau_{brake,f} \\ \tau_{brake,r} \\ dF_z \end{bmatrix} = \begin{bmatrix} \text{Yaw rate} \\ \text{Velocity} \\ \text{Sideslip} \\ \text{Roadwheel angle} \\ \text{Rear wheelspeed} \\ \text{Lateral error} \\ \text{Course error} \\ \text{Engine torque} \\ \text{Front brake torque} \\ \text{Rear brake torque} \\ \text{Longitudinal weight transfer state} \end{bmatrix} \tag{3}$$

where r represents yaw rate, V represents vehicle velocity, β represents sideslip, etc.

The corresponding state derivatives describing this vehicle model are given respectively in equations (4) below as:

$$\begin{bmatrix} \dfrac{aF_{yf}\cos(\delta) + aF_{xf}\sin(\delta) - bF_{yr} + \tau_{bb}}{I_z} \\ \dfrac{(-F_{yr}\sin(\delta-\beta) + F_{xf}\cos(\delta-\beta) + \left(F_{yr}^z + F_{gy}\right)\sin(\beta) + (F_{xr} + F_{gx})\cos(\beta))}{(m)} \\ \dfrac{(F_{yf}\cos(\delta-\beta) + F_{xf}\sin(\delta-\beta) + (F_{yr} + F_{gy})\cos(\beta) - (F_{xr} - F_{gx})\sin(\beta))}{mV} - r \\ \dot{\delta} \\ \dfrac{r_w(\tau - F_{xr}r_w)}{I_w} \\ V\Delta\phi \\ \dot{\beta} + \dot{r} - \kappa_{ref}\dfrac{V\cos(\Delta\phi)}{1-\kappa_{ref}e} \\ \dot{\tau} \\ \dot{\tau}_{brake,f} \\ \dot{\tau}_{brake,r} \\ -k\left(dF_z - \dfrac{h_{eg}}{a+b}F_{xnet}\right) \end{bmatrix} \tag{4}$$

where vehicle parameters are given in Table 1 below. The tire forces are given by a coupled slip Fiala tire model (used for vehicle simulations) for the front and rear longitudinal and lateral forces $F_{xf,r}$ and $F_{yf,r}$, respectively. The yaw moment created from differential lateral braking is given as $\tau_{bb}$. Road topology is incorporated through the longitudinal and lateral gravitational forces, $F_{gx}$ and $F_{gy}$, respectively. Lastly, $K_{ref}$ is the reference trajectory curvature.

TABLE 1

Vehicle Parameters

| Symbol | Parameter |
|---|---|
| a | Front axle CoM distance |
| b | Rear axle CoM distance |
| $h_{cg}$ | Center of gravity height |
| $r_w$ | Tire radius |
| m | Vehicle mass |
| $I_z$ | Vehicle yaw moment of inertia |
| $I_w$ | Lumped rear axle yaw moment of inertia |

To easily represent obstacles, the reference trajectory path, and trajectory states inside the NMPC, the vehicle dynamics are converted to spatial terms along the curvilinear coordinate system relative to the original reference trajectory, as shown in the differential equation (5) below:

$$\frac{dx}{ds} = \frac{1}{\dot{s}}\frac{dx}{dt} = \frac{(1-\kappa_{ref}e)}{V\cos\Delta\phi}\frac{dx}{dt} \quad (5)$$

The vehicle dynamics are discretized using a second-order implicit Runge-Kutta method, which is a widely used iterative method for solving differential equations that balances accuracy with computational effort. In an example, in order to have increased integration accuracy in the first part of the horizon but still maintain a long enough look-ahead distance to effectively react to unexpected/sudden obstacles, the first 5 points of the horizon as represented by the differential equation have a step length of ds=3 m and the remaining horizon points have a step length of ds=7 m. 20 points have been used in the NMPC horizon, for example, giving a total horizon distance of 120 m.

Results

Figure 4:
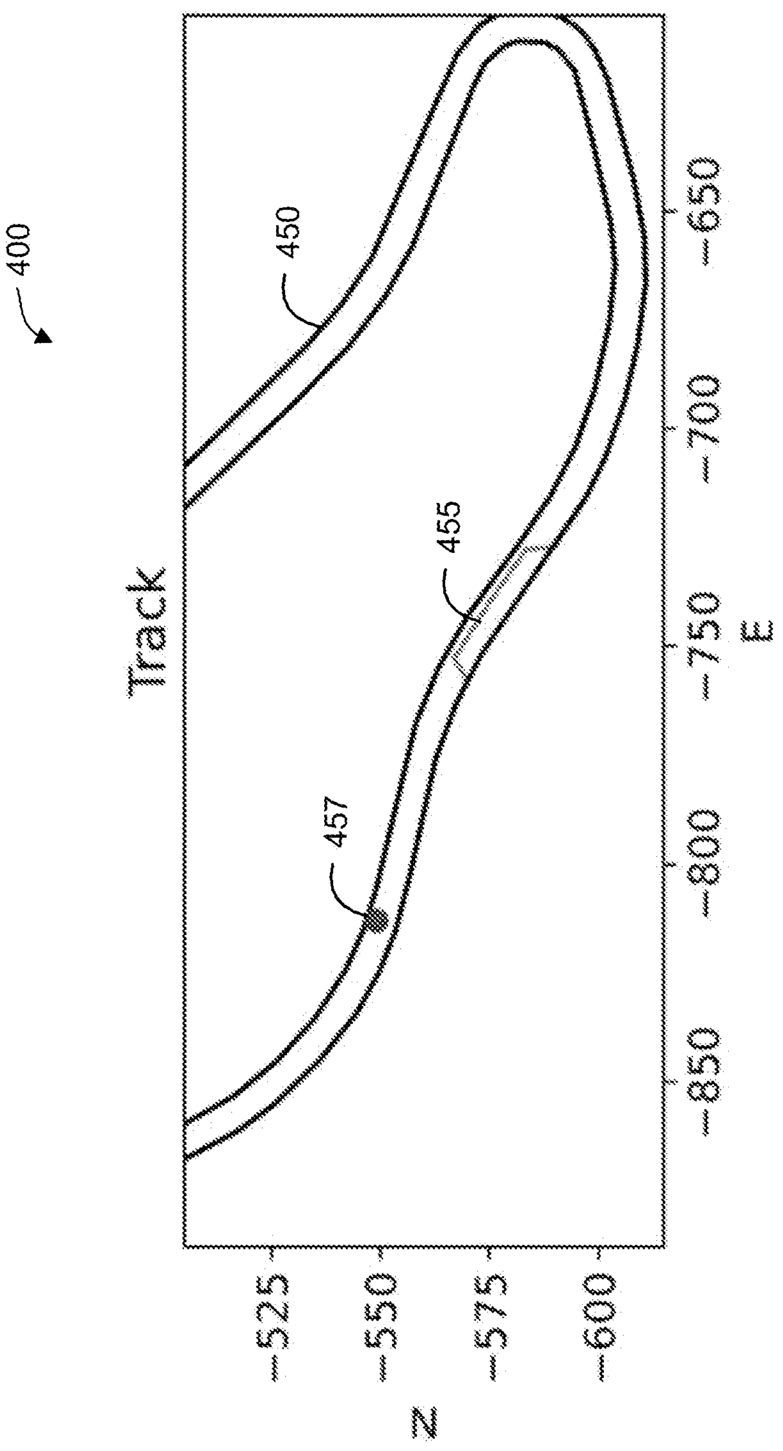
FIG. 4 is a plot illustrating east-north distances for an example track section of a race course used in testing an example vehicle equipped with a vehicle control system for trajectory planning, in accordance with embodiments disclosed herein.

FIG. 4 is a plot 400 illustrating east-north distances (in meters) for an example test track section 450 of a race course used in testing an example vehicle equipped with a vehicle control system for trajectory planning, in accordance with embodiments disclosed herein. Tests were performed on the experimental vehicle on the West track at Thunderhill Raceway, California, USA. The West track is a two-mile long course that consists of various race features including straights, high speed turns, chicanes, hairpins, and significant topology. A section of the test track 450 is shown in FIG. 4 along with an obstacle 455 and point 457 where MPC becomes aware of the obstacle 455. The location of the obstacle 455, i.e., immediately after a blind hill, was selected to provide a realistic and challenging obstacle avoidance scenario. The point at which MPC becomes aware of the obstacle 455 is at s=871 (where s represents path distance in meters, see FIG. 5 discussed more fully below), corresponding to the crest of the hill where the obstacle becomes physically visible. The obstacle 455 is 30 m long with a 5 m magnitude and begins at s=934. At the viewpoint, the vehicle is traveling nearly 30 m/s with the obstacle 455 just 63 m away.

Figure 5:
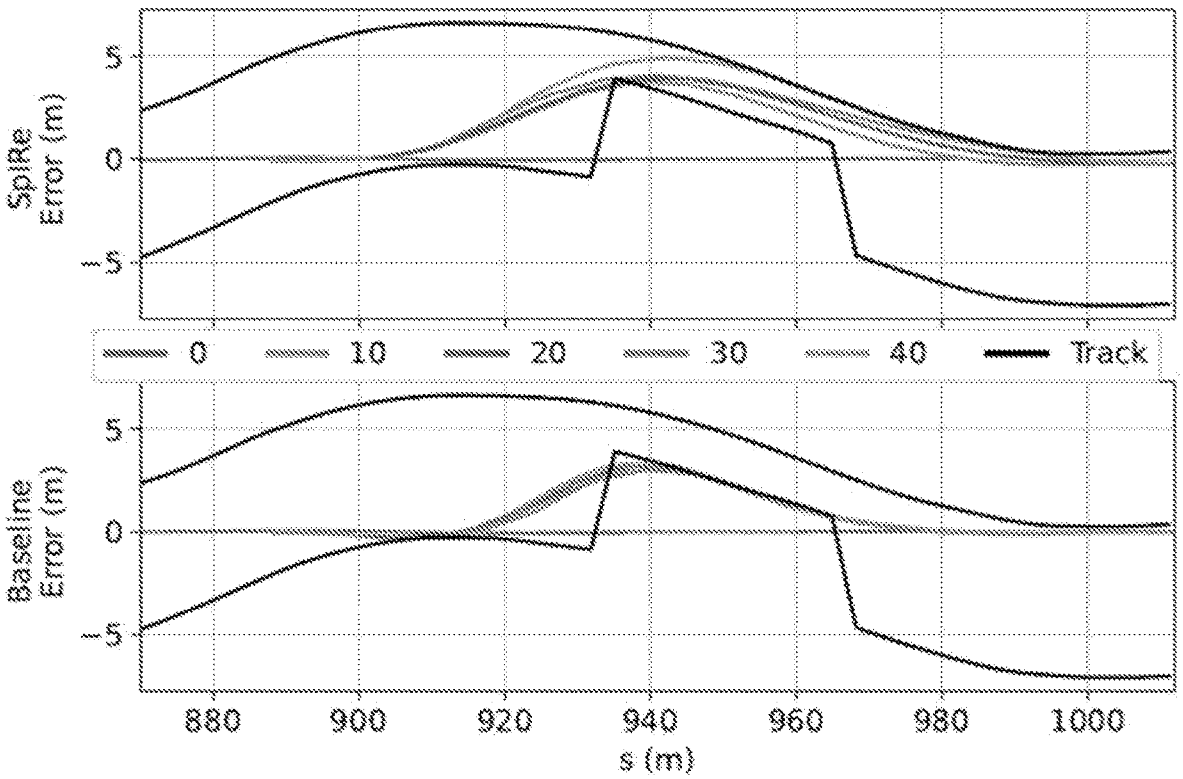
FIG. 5 are plots illustrating obstacle avoidance with spatial iterative replanning (top) and baseline (bottom) experiments showing every tenth model predictive control solution for lateral error.

1) Comparative Obstacle Avoidance at 90% of available friction: Comparative tests were performed at an imposed limit of up to 90% of friction utilization with SplRe and with MPC with a static reference trajectory (baseline). While several repetitions of each test were run and the results demonstrate repeatability, one sample of each case is shown for brevity. FIG. 5 is a plot comparison 500 illustrating obstacle avoidance with a SplRe experiment (top plot) and baseline experiment (bottom plot) showing every tenth MPC solution for lateral error. FIG. 5 depicts the planned path, in curvilinear coordinates, of every tenth MPC solution for the SplRe experiment (top plot) and baseline experiment (bottom plot). In the SplRe experiment case (top plot), the vehicle path iteratively adjusts to avoid the obstacle, decreasing the amount of overlap with each successive solve, until the 40th iteration clears the obstacle completely. This is in stark contrast with the baseline experiment case (bottom plot), where the (constant and non-updated weights) dependence on the reference trajectory causes the planned paths to remain relatively constant throughout, and always intersect the obstacle significantly.

Figure 6:
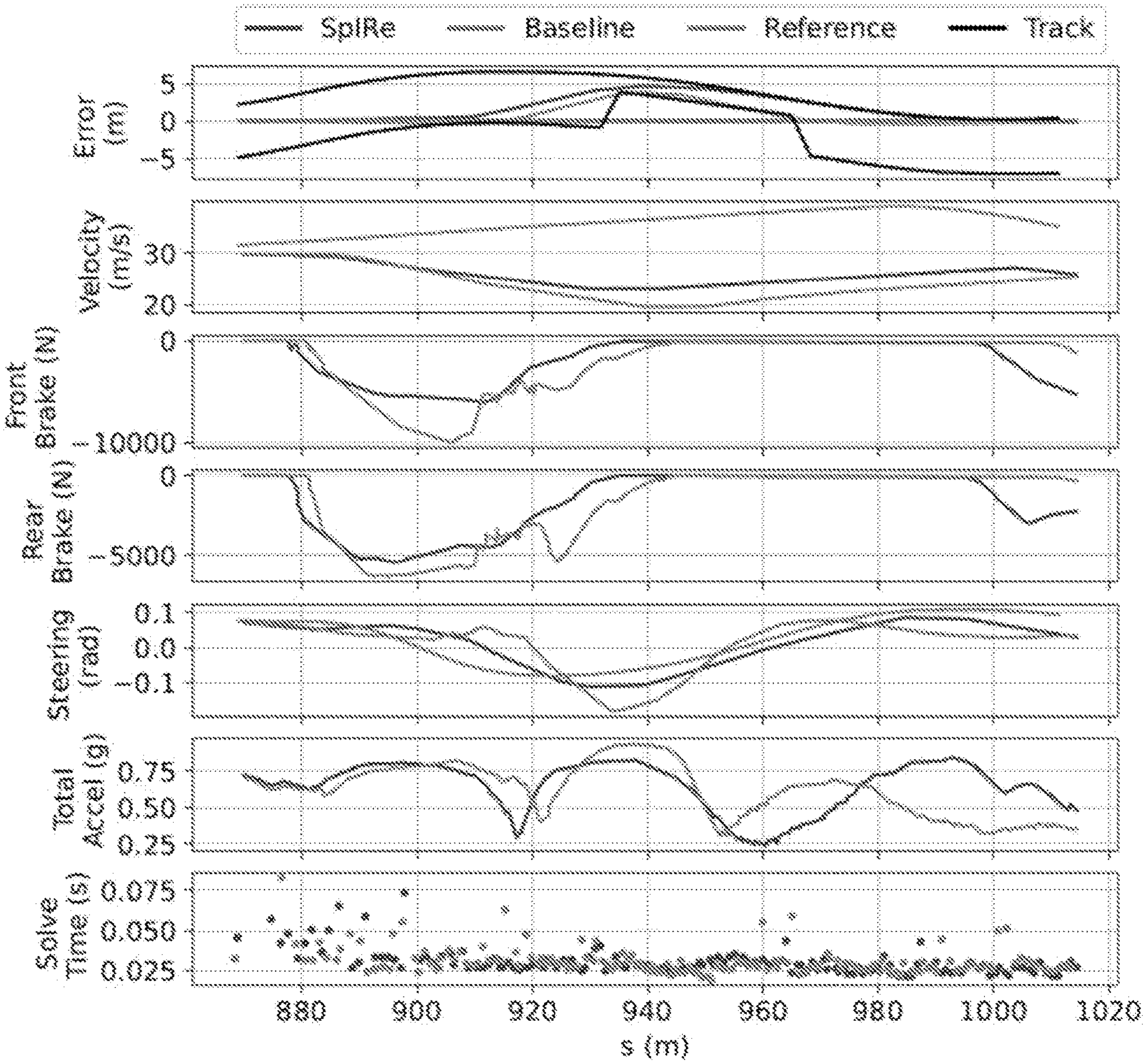
FIG. 6 are plots illustrating obstacle avoidance with spatial iterative replanning and baseline experiments showing a comparison of selected measured states and inputs, at 90% of friction on the test track.

FIG. 6 is a plot comparison 600 illustrating obstacle avoidance with SplRe and baseline experiments for selected measured states and inputs of the two experiments, at 90% of friction on the test track 450 shown in FIG. 4. In addition to avoiding the obstacle more effectively, it is shown that SplRe also maintains higher speeds (second plot from top). Importantly, the SplRe case also requires less drastic braking inputs (third and fourth plots from top), preventing the pressure spikes from ECU intervention seen in the baseline case between s=910 and s=925. The steering input is also significantly different (fifth plot from top). Specifically, the SplRe case commands more steering early in the maneuver in contrast to the delayed and drastic steering adjustments in the baseline case. This smoother response also leads to less acceleration for the SplRe case than the baseline (sixth plot from top). Finally, while the SplRe case generally outperforms the baseline case, the solve times remain relatively similar, demonstrating reliable real-time capability.

Figure 7:
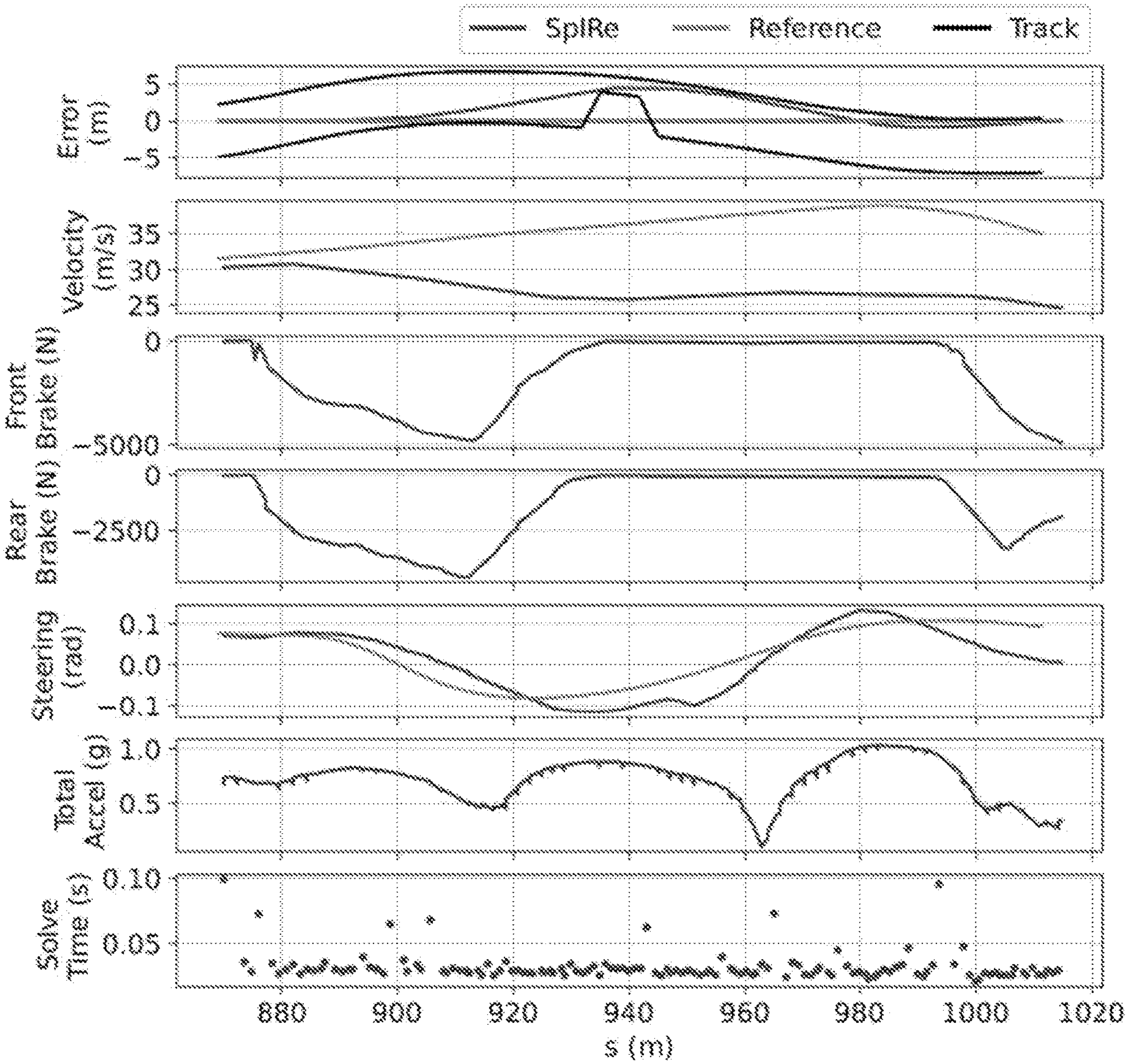
FIG. 7 are plots illustrating obstacle avoidance with a spatial iterative replanning experiment showing a comparison of selected measured states and inputs, at 95% of friction on the test track.

2) Obstacle Avoidance with SplRe at 95% of available friction (i.e., closer to the limits of vehicle handling compared to the 90% case): SplRe was tested at up to 95% of available friction on the test track 450 shown in FIG. 4. In this test, the obstacle length was reduced to 10 m. The baseline MPC was not tested for comparison due to the aggressive behavior and the results already observed in the previous experiments at 90%. FIG. 7 is a plot comparison 700 illustrating obstacle avoidance with a SplRe experiment for selected measured states and inputs, at 95% of friction on the test track 450 shown in FIG. 4. SplRe successfully avoids the obstacle despite the higher speeds from the expanded friction utilization. Similar behavior is observed as the 90% case, except the maneuver is completed at slightly higher speeds, slightly greater acceleration, and with less brake input. Furthermore, the solve times are stable despite operating closer to the limits of vehicle handling. These results further demonstrate the ability of SplRe to operate successfully at close to the limits of vehicle handling.

CONCLUSION

The SplRe approach presented in this disclosure can incrementally replan infeasible reference trajectories online. Per this example implementation, the SplRe scheme is demonstrated in emergency obstacle avoidance scenarios (where a blocking obstacle suddenly appears), and comparative full-scale experiments are performed, at 95% of the available friction on a racetrack. The experiments show that the SplRe approach diminishes the impact of conflicting reference trajectory signals, while incrementally updating reference trajectory plans that consider the vehicle's nonlinear dynamics (which include, for example, tire dynamics such as tire saturation and tire friction) in real-time. In other words, the experiments demonstrate the improved safety and performance achieved by this approach at up to 95% of friction utilization, as compared to a baseline formulation approach. Comparative experiments demonstrate SplRe can better prevent collisions, especially at higher speeds, and with smoother and less input required than a baseline approach.

Figure 8:
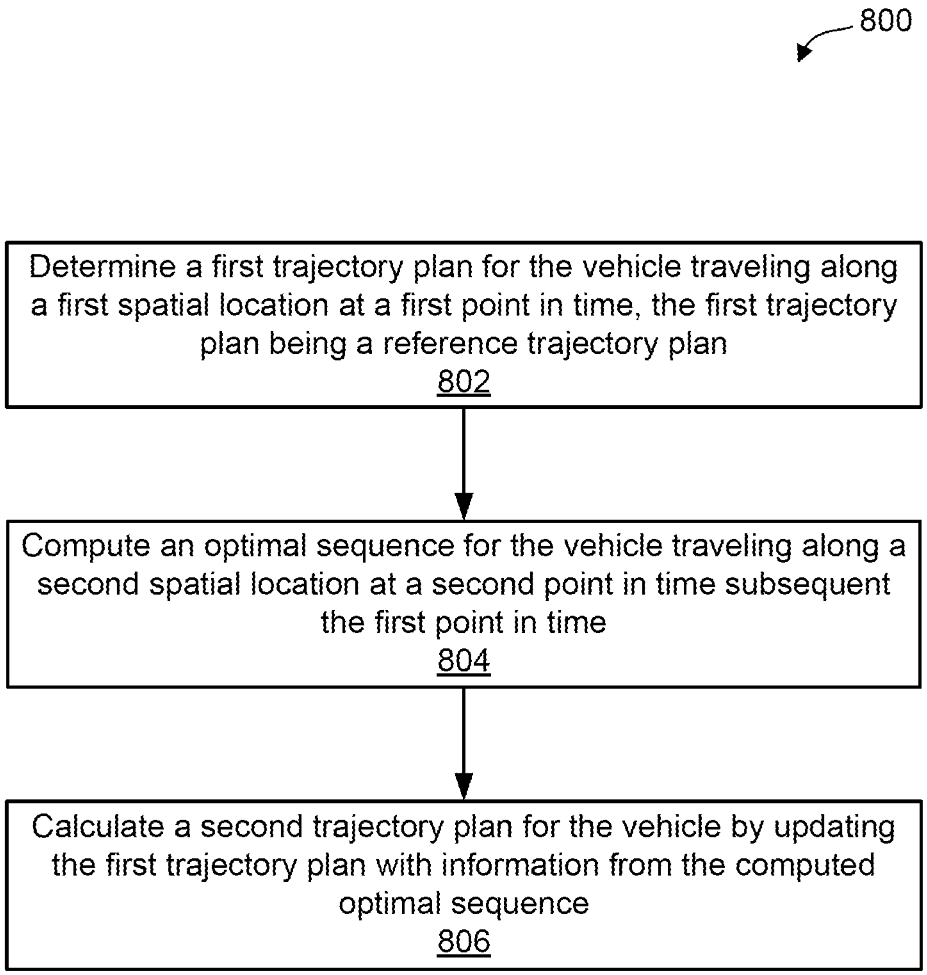
FIG. 8 is a flowchart illustrating example operations for iterative trajectory replanning, in accordance with embodiments disclosed herein.

FIG. 8 is a flowchart illustrating example operations that can be performed for iterative trajectory planning for an autonomous vehicle, in accordance with some embodiments disclosed herein. Inherent in this process is the ability to provide iterative trajectory planning in real-time for emergency obstacle avoidance or consideration of environmental changes. Example method 800 may be performed by the corresponding systems of the vehicles illustrated in FIGS. 1-3.

At operation 802, a first trajectory plan for a vehicle traveling along a first spatial location at a first point in time is determined. The first trajectory plan is a reference trajectory plan. The reference trajectory plan can be stored offline in a memory of a server (e.g., a cloud server) that is accessible via the internet. The information related to the reference trajectory plan is derived at a prior point in time, i.e., it is not real-time data, and may be in the form of a look-up table or other hierarchal form of data that is able to be looked-up, accessed, and downloaded.

At operation 804, an optimal sequence for the vehicle traveling along a second spatial location at a second point in time subsequent the first point in time is computed. The computation of the optimal sequence (or optimal solution) is performed online and in real-time and corresponds to a new optimal solution that preferably allows for a reduction in the relative weight of the previously computed, or otherwise obtained, reference trajectory plan.

At operation 806, a second trajectory plan for the vehicle is calculated by updating the first trajectory plan with information from the computed optimal sequence. This approach incrementally updates/improves reference trajectories when needed, thereby achieving reliable real-time implementation even when the pre-computed reference trajectory is or becomes infeasible (e.g., due to changing environmental condition such as an ice patch, or when a blocking obstacle suddenly appears in the vehicle path). As briefly mentioned above, it is understood that if the second trajectory plan only considered information from the computed optimal sequence (i.e., without relying on the first/reference trajectory plan in the calculation of the second trajectory plan), an obstacle/environmental change suddenly appearing in the trajectory would likely cause a trajectory change that would require an immediate/drastic adjustment from the previous trajectory, resulting in a jarring shift in vehicle direction (and, hence, for the vehicle's occupants) in order to avoid the obstacle/environmental change. Whereas, when the reference trajectory (or previous optimal trajectory when considering further iterations, as mentioned below) is used in the calculation of the second trajectory plan, a more gradual effect in the change in vehicle trajectory direction can be realized. This incremental replanning results in a smoother trajectory change from the first/reference trajectory plan to the second trajectory plan and a smoother experience from the perspective of the vehicle's occupants. Other benefits include finding an optimal path around the obstacle/environmental change without being burdened by the computational cost of finding a completely new trajectory or being influenced by signals that are invalid due to conflicts with changing environments.

In some examples, nonlinear dynamics of the vehicle are used in the determining of the first trajectory plan and the computing of the optimal sequence. The nonlinear dynamics of the vehicle may correspond to at least one of yaw rate, velocity, sideslip, roadwheel angle, rear wheel speed, lateral error, course error, engine torque, front brake torque, rear brake torque, and longitudinal weight transfer state. In one example, the nonlinear dynamics of the vehicle comprise tire dynamics such as tire saturation, tire friction, etc. Incorporating NMPC into the trajectory planning achieves a rapid iterative reference trajectory replanning with additional dynamic performance due to NMPC.

In some examples, the first trajectory plan comprises a trajectory that does not include an obstacle or environmental change, and the second trajectory plan comprises a trajectory that includes an obstacle or environmental change. In this scenario, the first trajectory plan is determined offline (i.e., via a pre-computed trajectory, look-up table, etc.), and the computing of the optimal sequence is performed in real-time (i.e., online, onboard the vehicle) whereby the optimal sequence is a current optimal sequence.

In some examples, the first trajectory plan is attributed less weight (e.g., less than 10% in weight) relative to the calculation of the second trajectory plan. The reduced weighting of the reference trajectory plan allows the calculation of the second trajectory to be less burdened by a previously obtained (out-of-date) and non-optimal reference trajectory plan.

In some examples, in consideration of further iterations of the trajectory planning scheme, the method further comprises: computing another optimal sequence for the vehicle traveling along a third spatial location at a third point in time subsequent the second point in time; and calculating a third trajectory plan for the vehicle by updating the second trajectory plan with information from the computed another optimal sequence, wherein the second trajectory plan is another reference trajectory plan in relation to the calculation of the third trajectory plan. In this further trajectory plan iteration, the second trajectory plan (which corresponds to the previous optimal trajectory solution) becomes the new reference trajectory plan used in the calculation of the third trajectory plan. The second trajectory plan (having previously been calculated as corresponding to the previous optimal trajectory solution) can therefore be stored and accessed in an offline or online manner. Whereas the computing of the another optimal sequence is performed in real-time (i.e., online, onboard the vehicle) whereby the another optimal sequence becomes a (new) current optimal sequence. In this scenario, in one example, the second trajectory plan and the third trajectory plan comprise trajectories that include an obstacle or environmental change. Further iterations of this trajectory planning scheme may be made until the vehicle passes around the obstacle/environmental change.

In some examples, the second trajectory plan is attributed less weight (e.g., less than 10% in weight) relative to the calculation of the third trajectory plan. The reduced weighting of the second trajectory plan (i.e., the new reference trajectory) allows the calculation of the third trajectory to be less burdened by a previously obtained (out-of-date) and non-optimal second trajectory plan.

Figure 9:
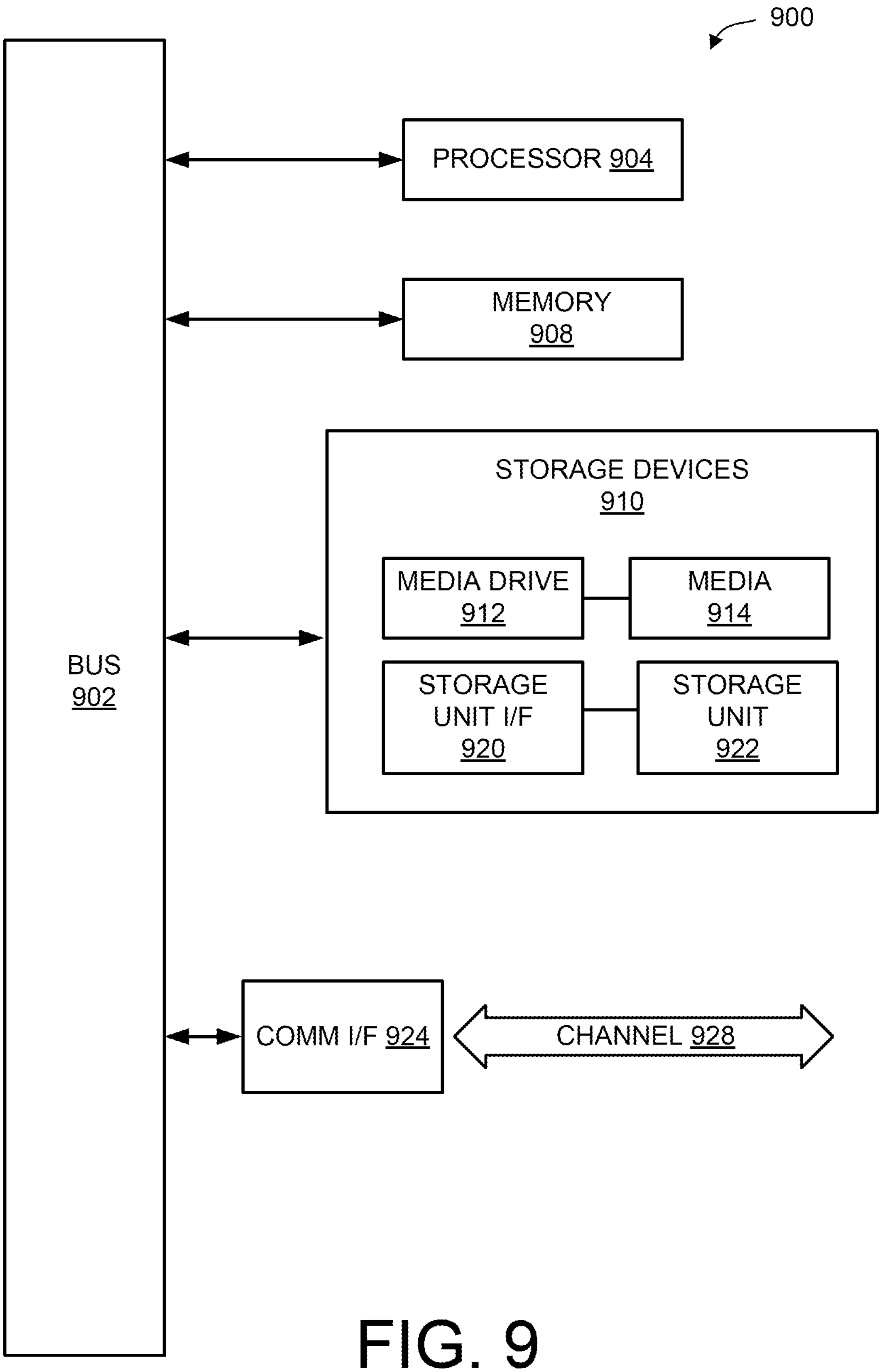
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices, such as a processor 904. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanisms/devices 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanisms/devices 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 922, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of trajectory planning for autonomous vehicles, comprising:

- determining a first trajectory plan for a vehicle traveling along a first spatial location at a first point in time, wherein the first trajectory plan is a reference trajectory plan;
- computing an optimal sequence for the vehicle traveling along a second spatial location at a second point in time subsequent the first point in time;
- identifying a conflict between the first trajectory plan and the second spatial location based on the second spatial location exceeding a track boundary of the first trajectory plan;
- calculating a second trajectory plan for the vehicle by updating the first trajectory plan with information from the computed optimal sequence to resolve the identified conflict; and
- engaging the vehicle's autonomous driving system to operate the vehicle in accordance with the second trajectory plan.

2. The method of claim 1, wherein nonlinear dynamics of the vehicle are used in the determining of the first trajectory plan and the computing of the optimal sequence.

3. The method of claim 2, wherein the nonlinear dynamics of the vehicle correspond to at least one of yaw rate, velocity, sideslip, roadwheel angle, rear wheel speed, lateral error, course error, engine torque, front brake torque, rear brake torque, and longitudinal weight transfer state.

4. The method of claim 2, wherein the nonlinear dynamics of the vehicle comprise tire dynamics.

5. The method of claim 1, wherein the first trajectory plan comprises a trajectory that does not include an obstacle or environmental change, and the second trajectory plan comprises a trajectory that includes an obstacle or environmental change.

6. The method of claim 1, wherein the first trajectory plan is determined offline, and the computing of the optimal sequence is performed in real-time whereby the optimal sequence is a current optimal sequence.

7. The method of claim 1, wherein the first trajectory plan is attributed less weight relative to the calculation of the second trajectory plan.

8. The method of claim 1, wherein the method further comprises:

- computing another optimal sequence for the vehicle traveling along a third spatial location at a third point in time subsequent the second point in time; and
- calculating a third trajectory plan for the vehicle by updating the second trajectory plan with information from the computed another optimal sequence, wherein the second trajectory plan is another reference trajectory plan in relation to the calculation of the third trajectory plan.

9. The method of claim 8, wherein the second trajectory plan and the third trajectory plan comprise trajectories that include an obstacle or environmental change.

10. The method of claim 8, wherein the second trajectory plan is attributed less weight relative to the calculation of the third trajectory plan.

11. A vehicle control system for trajectory planning for autonomous vehicles, comprising:

- one or more processors; and
- a memory coupled to the processor to store instructions, which when executed by the one or more processors, cause the one or more processors to perform operations, the operations comprising:
  - determining a first trajectory plan for a vehicle traveling along a first spatial location at a first point in time, wherein the first trajectory plan is a reference trajectory plan;
  - computing an optimal sequence for the vehicle traveling along a second spatial location at a second point in time subsequent the first point in time;
  - identifying a conflict between the first trajectory plan and the second spatial location based on the second spatial location exceeding a track boundary of the first trajectory plan;
  - calculating a second trajectory plan for the vehicle by updating the first trajectory plan with information from the computed optimal sequence to resolve the identified conflict; and
  - engaging the vehicle's autonomous driving system to operate the vehicle in accordance with the second trajectory plan.

12. The vehicle control system of claim 11, wherein nonlinear dynamics of the vehicle are used in the determining of the first trajectory plan and the computing of the optimal sequence.

13. The vehicle control system of claim 12, wherein the nonlinear dynamics of the vehicle correspond to at least one of yaw rate, velocity, sideslip, roadwheel angle, rear wheel speed, lateral error, course error, engine torque, front brake torque, rear brake torque, and longitudinal weight transfer state.

14. The vehicle control system of claim 12, wherein the nonlinear dynamics of the vehicle comprise tire dynamics.

15. The vehicle control system of claim 11, wherein the first trajectory plan comprises a trajectory that does not include an obstacle or environmental change, and the second trajectory plan comprises a trajectory that includes an obstacle or environmental change.

16. The vehicle control system of claim 11, wherein the first trajectory plan is determined offline, and the computing of the optimal sequence is performed in real-time whereby the optimal sequence is a current optimal sequence.

17. The vehicle control system of claim 11, wherein the first trajectory plan is attributed less weight relative to the calculation of the second trajectory plan.

18. The vehicle control system of claim 11, wherein the operations further comprise:

computing another optimal sequence for the vehicle traveling along a third spatial location at a third point in time subsequent the second point in time; and calculating a third trajectory plan for the vehicle by updating the second trajectory plan with information from the computed another optimal sequence, wherein the second trajectory plan is another reference trajectory plan in relation to the calculation of the third trajectory plan.

19. The vehicle control system of claim 18, wherein the second trajectory plan and the third trajectory plan comprise trajectories that include an obstacle or environmental change.

20. The vehicle control system of claim 18, wherein the second trajectory plan is attributed less weight relative to the calculation of the third trajectory plan.

21. A non-transitory machine-readable medium having instructions stored therein, which when executed by one or more processors, cause the one or more processors to perform operations, the operations comprising:

determining a first trajectory plan for a vehicle traveling along a first spatial location at a first point in time, wherein the first trajectory plan is a reference trajectory plan;

computing an optimal sequence for the vehicle traveling along a second spatial location at a second point in time subsequent the first point in time;

identifying a conflict between the first trajectory plan and the second spatial location based on the second spatial location exceeding a track boundary of the first trajectory plan;

calculating a second trajectory plan for the vehicle by updating the first trajectory plan with information from the computed optimal sequence to resolve the identified conflict; and engaging the vehicle's autonomous driving system to operate the vehicle in accordance with the second trajectory plan.

* * * * *